July 25, 1933.  H. S. HASSELQUIST  1,919,552

ATTACHING GROMMETS TO METAL PLATES

Filed June 26, 1930

INVENTOR.
Hugo S. Hasselquist
BY
ATTORNEY.

Patented July 25, 1933

1,919,552

UNITED STATES PATENT OFFICE

HUGO S. HASSELQUIST, OF MILWAUKEE, WISCONSIN, ASSIGNOR TO A. O. SMITH CORPORATION, OF MILWAUKEE, WISCONSIN, A CORPORATION OF NEW YORK

ATTACHING GROMMETS TO METAL PLATES

Application filed June 26, 1930. Serial No. 463,963.

This invention relates to a method of connecting parts such as grommets to metal plates, and in its broader aspects, is applicable to securing parts such as bushings, grommets, nuts, lugs, bolts, rivets and the like to plates or similar members in such manner as to rigidly retain the parts within the plate.

As distinguished from prior methods for securing such parts to plates wherein a stud or projection on the part was inserted into an aperture within the plate and the end of the stud or projection spread or riveted to secure the part to the plate, the present invention provides a method whereby the metal of the plate itself is upset so as to rigidly secure the part to the plate.

In practicing the invention, the stresses set up in the plate while the part is being secured thereto tend to resist the normal stresses tending to loosen the part after the same is in place as will be more fully described hereinafter.

The accompanying drawing illustrates a preferred manner of carrying out the invention in the securing of bosses and nuts to metal plates.

Figure 2:
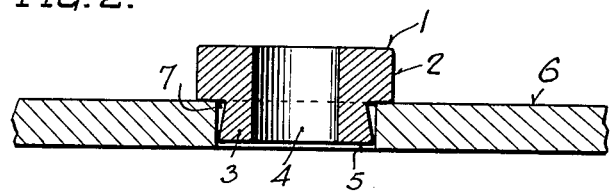
Fig. 2 is a sectional view showing the boss inserted within a perforation in a plate.

Referring to the drawing, the numeral 1 indicates a special shaped boss having a body portion 2 with a projection 3 extending from one face thereof. The boss may be provided with a central aperture 4. The projection 3 tapers inwardly toward the face of the body portion so that the outer end of the projection has a greater thickness than that portion of the projection adjacent the body portion. The length of the projection is preferably slightly less than the thickness of the plate to which it is to be attached, as is shown in Fig. 2.

Figure 1:
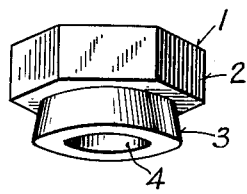
Fig. 1 is a perspective view of a boss which is constructed for use in carrying out the present invention.
Figure 3:
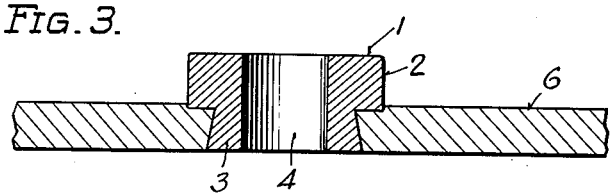
Fig. 3 is a sectional view showing the boss secured to the plate.

It is desirable that either the body portion or the projection be of non-circular contour so as to insure that the boss will not rotate within the plate when the same is fastened therein. In the illustration of Figs. 1, 2 and 3, the body portion 2 is of non-circular contour while in Figs. 4 and 5, the shank is non-circular.

Figure 6:
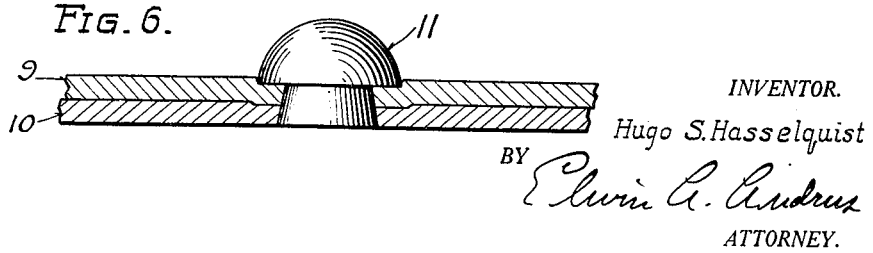
Fig. 6 is an elevation of a modified form of boss showing the employment of the invention in securing two plates together, the plates being shown in section.

For some purposes, it is possible to make both the body and shank of the boss of circular contour, it being found that the gripping of the shank by the metal of the plate is sufficient to prevent relative rotation therebetween. The circular form of boss may also be used when the boss is employed as a rivet, as shown in Fig. 6.

The projection on the boss thus formed is inserted within an aperture 5 in the plate 6 and pressure is applied to the face of the boss sufficient to cause the body portion to become seated in the plate to a depth such that the end of the projection becomes flush with the lower face of the plate, as is shown in Fig. 3. The embedding of the boss within the plate causes the metal adjacent the aperture 5 to be upset and to flow into the recess 7 between the tapered wall of the projection and the side wall of the perforation. This flow of metal rigidly secures the boss to the plate.

It is desirable, when working with comparatively thin stock, to provide some suitable backing to aid the plate to resist the upsetting pressure. After the boss is secured in position, axial pressure upon the boss normally tending to loosen the boss within the plate, will in the present invention tend to further compress the metal and to force the same into more rigid engagement with the walls of the projection and thus more securely clamp the same in position.

Furthermore, the present invention makes it possible to secure a part to a plate which is accessible on one side only inasmuch as the part, and pressure for securing the same, may be applied on but one face of the plate.

Figure 4:
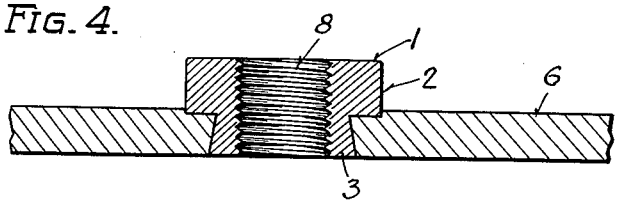
Fig. 4 is a similar view showing a modified form of boss.
Figure 5:
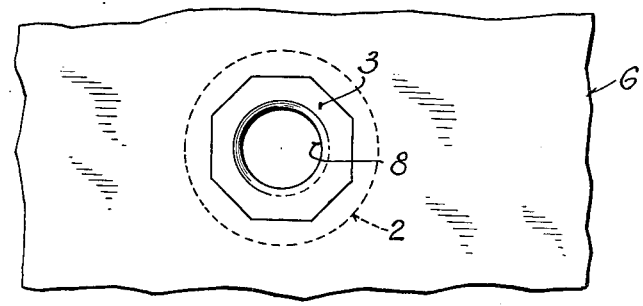
Fig. 5 is a bottom plan view of Fig. 4.

In the modification shown in Figs. 4 and 5, the boss is provided with a threaded aperture 8 for securing bolts or other threaded members to the plate.

As shown in Fig. 6, the invention may be employed for securing two plates 9 and 10 together, the shank of the lug or rivet 11 for securing the plates being tapered as in the other forms of bosses and extending through aligned apertures in the plates, and the metal adjacent the apertures upset to firmly engage the shank of the rivet.

The term "boss" as employed in this specification is intended to include all such parts previously mentioned, such as nuts, lugs, grommets, rivets, bolts or the like.

I claim:

1. A method of securing a boss to a metal plate which comprises providing a boss having a body portion and an inwardly tapering shank portion extending from one of the faces of said body portion, inserting the shank of said boss into a perforation in a plate having a thickness greater than the length of said shank, and applying pressure to the body portion of said boss to cause the same to become seated in the metal plate to a depth sufficient to displace the metal about the perforation in the plate into engagement with the tapered walls of said shank.

2. A method of securing a boss to a plate which comprises providing a boss having a body portion of non-circular contour and an inwardly tapering shank extending from one face of said body portion, inserting said shank into an aperture provided in the plate, and applying axial pressure to said boss to seat the body portion in said plate and flow the material of the plate adjacent the walls of the perforation into firm engagement with the tapered shank whereby said boss is fastened to said plate and prevented from turning relative thereto.

3. A method of securing parts which comprises providing perforations in said parts, arranging the parts in juxtaposition with the perforations aligned, providing a boss having a head and an inwardly tapering axially extending shank, inserting said shank through said aligned apertures, and applying axial pressure to said boss to force the walls of the perforation into firm engagement with the tapering walls of the shank.

4. A method of attaching a boss to a metal plate which comprises, providing a boss having a body portion and an inwardly tapering projection, inserting the projection into an opening formed in the metal plate, and pressing the body portion of the boss into the plate to flow the metal of the plate adjacent the walls of the opening into firm engagement with the tapered projection of the boss.

5. A boss for mounting in thin metal members to facilitate the connecting of them to other members, comprising a head, a shank formed integral with the head, the shank simulating a conic-frustum, the small diameter being next the head forming an angular groove therewith for receiving the metal of the thin members when flowed in the attaching of the boss, the head and shank being perforated to form a cylindrical opening to receive a connecting member.

HUGO S. HASSELQUIST.